United States Patent
Kim et al.

(10) Patent No.: US 9,574,889 B2
(45) Date of Patent: Feb. 21, 2017

(54) APPARATUS AND METHOD FOR PROVIDING DISTANCE TO EMPTY OF GREEN VEHICLE

(71) Applicant: HYUNDAI MOTOR COMPANY, Seoul (KR)

(72) Inventors: Sang Joon Kim, Seoul (KR); Baro Hyun, Seongnam-si (KR); Kyu Hwan Jo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/558,353

(22) Filed: Dec. 2, 2014

(65) Prior Publication Data
US 2015/0369619 A1    Dec. 24, 2015

(51) Int. Cl.
*G01R 31/36*     (2006.01)
*G01C 21/34*     (2006.01)
(Continued)

(52) U.S. Cl.
CPC .......... *G01C 21/3469* (2013.01); *B60W 20/13* (2016.01); *B60K 2350/1092* (2013.01);
(Continued)

(58) Field of Classification Search
USPC ........ 701/22, 527, 123, 423, 42, 3; 340/428, 340/455, 4, 439, 631.1, 438; 702/61, 63; 320/132
See application file for complete search history.

(56) References Cited

U.S. PATENT DOCUMENTS

| | | | | |
|---|---|---|---|---|
| 8,296,048 B2* | 10/2012 | Henderson | ............. | B60K 35/00 180/69.4 |
| 8,860,565 B2* | 10/2014 | Skaff | ...................... | B60K 35/00 340/425.5 |
| 8,862,375 B2* | 10/2014 | Heo | ..................... | B60L 11/1861 320/132 |
| 2005/0107207 A1* | 5/2005 | Imazu | ................... | B60K 6/365 477/35 |

(Continued)

FOREIGN PATENT DOCUMENTS

| | | |
|---|---|---|
| JP | 2001-169408 A | 6/2001 |
| JP | 2006-115623 A | 4/2006 |

(Continued)

OTHER PUBLICATIONS

Overlooking L1 charging at-work in the rush for public charging speed; Bruninga, R; Electric Vehicle Conference (IEVC), 2012 IEEE International; Year: 2012; pp. 1-5, DOI: 10.1109/IEVC.2012.6183178.*

(Continued)

*Primary Examiner* — Cuong H Nguyen
(74) *Attorney, Agent, or Firm* — McDermott Will & Emery LLP

(57) ABSTRACT

An apparatus for providing a distance to empty of a green vehicle includes a motor. A battery provides a driving voltage to the motor and includes a plurality of cells. A motor controller is configured to control driving and a torque of the motor. A battery manager is configured to control charge and discharge of the battery. A vehicle controller is configured to integratedly control the motor controller and the battery manager according to a state of the vehicle through a network. The vehicle controller calculates a first distance to empty (DTE) by using a past fuel efficiency, calculates a second DTE by using designated route driving information, and calculates a final DTE by using the first DTE and the second DTE.

17 Claims, 5 Drawing Sheets

(51) Int. Cl.
    *B60R 16/023* (2006.01)
    *B60L 11/18* (2006.01)
(52) U.S. Cl.
    CPC ... *B60K 2350/1096* (2013.01); *B60L 11/1861* (2013.01); *B60R 16/0236* (2013.01)

(56) References Cited

U.S. PATENT DOCUMENTS

| | | | | |
|---|---|---|---|---|
| 2007/0111852 | A1* | 5/2007 | Yatabe | B60K 6/445 477/107 |
| 2011/0224894 | A1* | 9/2011 | Henderson | B60K 35/00 701/123 |
| 2012/0176231 | A1* | 7/2012 | Skaff | B60K 35/00 340/439 |
| 2012/0179318 | A1* | 7/2012 | Gilman | B60W 50/0097 701/22 |
| 2012/0179319 | A1* | 7/2012 | Gilman | B60W 50/0097 701/22 |
| 2012/0179395 | A1* | 7/2012 | Gilman | B60L 11/1861 702/61 |
| 2013/0253740 | A1* | 9/2013 | Kim | B60L 1/003 701/22 |
| 2014/0095060 | A1* | 4/2014 | Heo | B60L 11/1861 701/123 |
| 2015/0367856 | A1* | 12/2015 | Meyer | B60W 40/12 701/123 |

FOREIGN PATENT DOCUMENTS

| | | |
|---|---|---|
| JP | 2009-516829 A | 4/2009 |
| KR | 10-1998-0017054 A | 6/1998 |
| KR | 10-2013-0036948 A | 4/2013 |
| KR | 10-2013-0068242 A | 6/2013 |
| KR | 10-2013-0129738 A | 11/2013 |

OTHER PUBLICATIONS

Crowd sourced energy estimation in connected vehicles; Jayakumar, A.; Ingrosso, F.; Rizzoni, G.; Meyer, J.; Doering, J.; Electric Vehicle Conference (IEVC), 2014 IEEE International; Year: 2014; pp. 1-8, DOI: 10.1109/IEVC.2014.7056189.*

Guest Editorial:Special Section on Vehicle Power and Propulsions; IEEE Transactions on Vehicular Technology, vol. 59, No. 6, Jul. 2010.*

Status of the Community Energy Storage—Deployment at DTE Energy; H. Asgeirsson, Member, IEEE; 978-1-4577-1002-5/11/$26.00 ©2011 IEEE.*

A low-cost control system for BLDC motors applied to teaching; Fabelo, H.A.; Vega, A.; Cabrera, J.; Deniz, V.; Tecnologias Aplicadas a la Ensenanza de la Electronica (Technologies Applied to Electronics Teaching) (TAEE), 2014 XI; Year: 2014 pp. 1-6, DOI: 10.1109/TAEE.2014.6900164.*

Design and Control of Light Mobile Robotic System; Gao Jun-yao; Xiong Guangming; Xu Zhengfei; Mechatronics and Automation, Proceedings of the 2006 IEEE International Conference on; Year: 2006; pp. 1297-1301, DOI: 10.1109/ICMA.2006.257814.*

Special Section on Vehicle Power and Propulsions; Mi, C.; Peng, F. Z.; Vehicular Technology, IEEE Transactions on; Year: 2010, vol. 59, Issue: 6; pp. 2638-2640, DOI: 10.1109/TVT.2010.2050619.*

A comparative range approach using the Real World Drive Cycles and the Battery Electric Vehicle; Ross Milligan; Tariq Muneer; Ian Smith; Transportation Electrification Conference (ITEC), 2015 IEEE International; Year: 2015; pp. 1-5, DOI: 10.1109/ITEC-India.2015.7386934.*

Overlooking L1 charging at-work in the rush for public charging speed; Robert Bruninga; Electric Vehicle Conference (IEVC), 2012 IEEE International; Year: 2012; pp. 1-5, DOI: 10.1109/IEVC.2012.6183178.*

Automated urban vehicles: towards a dual mode PRT (Personal Rapid Transit); M. Parent; P. Daviet; Robotics and Automation, 1996. Proceedings., 1996 IEEE International Conference on; Year: 1996, vol. 4; pp. 3129-3134 vol. 4, DOI: 10.1109/ROBOT.1996.509188.*

Crowd sourced energy estimation in connected vehicles; Adithya Jayakumar; Fabio Ingrosso; Giorgio Rizzoni; Jason Meyer; Jeff Doering; Electric Vehicle Conference (IEVC), 2014 IEEE International; Year: 2014; pp. 1-8, DOI: 10.1109/IEVC.2014.7056189.*

* cited by examiner

APPARATUS AND METHOD FOR PROVIDING DISTANCE TO EMPTY OF GREEN VEHICLE

CROSS-REFERENCE TO RELATED APPLICATION

This application claims the benefit of priority to Korean Patent Application No. 10-2014-0077581 filed in the Korean Intellectual Property Office on Jun. 24, 2014, the entire contents of which are incorporated herein by reference.

TECHNICAL FIELD

The present disclosure relates to an apparatus and method for providing a distance to empty of a green vehicle, and more particularly, to an apparatus and method for providing a changed distance to empty (DTE) to a driver when an event occurs in driving information of a designated route.

BACKGROUND

Recently, global environmental contamination has become a serious issue, and thus, use of clean energy is becoming more and more important. Particularly, air pollution in major cities has become severe, and vehicle exhaust gas is one of main causes of the air pollution.

A green vehicle has been developed and operated in order to reduce such exhaust gas and to improve fuel efficiency.

The green vehicle is a future car that discharges little or no exhaust gas. The green vehicle includes a pure electric vehicle driven using power of an electric motor, a hybrid vehicle driven using combined power from a motor and an engine, or a fuel cell vehicle driven via power from an electric motor operated by electricity generated within a fuel cell.

A high-voltage battery as an electric power source for driving a motor, a converter, etc. is mounted in such a green vehicle.

The green vehicle monitors the voltage, current, temperature, etc. of the battery to estimate a temperature of the battery and a degree of degradation of the battery including a state of charge (SOC) of the battery. Accordingly, it is important to manage the battery state so as to maintain a predetermined level or higher.

One of the reasons for managing the battery state as described above is to monitor the SOC of the battery in real time to inform a driver of a distance to empty (DTE) corresponding to remaining capacity of the battery during driving.

In internal combustion engine vehicles, the driver is informed of the DTE estimated from the current fuel state. Similarly, in green vehicles, a remaining DTE corresponding to a remaining capacity of the battery is estimated from a current remaining capacity of the battery. This DTE may then be displayed on an instrument cluster or the like.

The conventional method for calculating the DTE calculates based on information regarding a traffic situation, a road slope, and an average vehicle speed. But in the prior art, when an event such as route correction, route deviation, addition of a stopover, change of destination, route cancellation, etc., occurs in designated route driving information, a changed DTE may not be provided to the driver.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for providing a changed distance to empty (DTE) to a driver in a green vehicle when an event occurs in driving information of a designated route.

An exemplary embodiment of the present inventive concept provides an apparatus and a method for calculating a distance to empty (DTE) in a green vehicle based on fuel efficiency computational amounts of past driving learning and fuel efficiency computational amounts of a designated route.

According to an exemplary embodiment of the present inventive concept, an apparatus for providing a distance to empty of a green vehicle includes a motor. A battery provides a driving voltage to the motor and includes a plurality of cells. A motor controller is configured to control driving and a torque of the motor. A battery manager is configured to control charge and discharge of the battery. A vehicle controller is configured to integratedly control the motor controller and the battery manager according to a state of the vehicle through a network. The vehicle controller may calculate a first distance to empty (DTE) by using a past fuel efficiency, calculates a second DTE by using designated route driving information, and calculates a final DTE by using the first DTE and the second DTE.

The vehicle controller may calculate the past fuel efficiency by using a past battery energy consumption and a past travel distance, and calculate the first DTE by using the past fuel efficiency and an available energy of the battery.

The vehicle controller may calculate a driving resistance of the vehicle by using at least one of a travel distance, road inclination information, and an average speed, calculate a fuel efficiency of a designated route by using at least one of a driving resistance, a battery capacity, and an average torque output of the motor, and calculate the second DTE by using the fuel efficiency of the designated route and an available energy of the battery.

The vehicle controller may calculate the final DTE by using the first DTE, the second DTE, and a correction coefficient.

The vehicle controller may calculate the final DTE by using Equation 1 below.

$$DTE=(DTE1*(1-a))+(DTE2*a), \qquad \text{[Equation 1]}$$

where DTE may be the final DTE, DTE1 may be the first DTE, DTE2 may be the second DTE, and a may be a correction coefficient.

The vehicle controller may calculate a difference between the first DTE and the second DTE, and determine the correction coefficient by using the difference between the first DTE and the second DTE and an available energy of the battery.

The vehicle controller may reset the designated route driving information when at least one event of route deviation, addition of a stopover, and change of a destination occurs in the designated route driving information, and calculate the second DTE by using the reset designated route driving information.

The vehicle controller may update the first DTE by using a battery energy consumption, and a travel distance which is used when at least one event of route cancellation and destination arrival occurs in the designated route driving information.

The vehicle controller may control a display to display the final DTE.

The final DTE may be displayed with blinking or outputted as a voice guidance.

According to another exemplary embodiment of the present inventive concept, a method for providing a distance to empty of a green vehicle includes calculating a first distance to empty (DTE) by using a past fuel efficiency. A second DTE is calculated regarding designated route driving information according to a departure point and a destination set by a user. A final DTE is calculated by using at least one of the first DTE and the second DTE, and the final DTE is displayed.

An exemplary embodiment of the present inventive concept can display a changed distance to empty (DTE) when an event occurs in driving information of a designated route, and a driver can perceive the changed DTE.

Further, the present disclosure can calculate the DTE based on fuel efficiency computational amounts of past driving learning and fuel efficiency computational amounts of a designated route, thus calculating a more accurate DTE.

The above effects desired to be achieved in the present disclosure are not limited to the aforementioned effects. In other words, effects not described above will be apparent to those skilled in the art from the disclosure of the present disclosure.

DETAILED DESCRIPTION OF THE EMBODIMENTS

Hereinafter, an operation principle of an apparatus and a method for providing a changed distance to empty (DTE) of a green vehicle of the present disclosure will be described in detail with reference to the description and the accompanying drawings. However, the drawings and the detailed description relate to one exemplary embodiment among several exemplary embodiments for effectively describing features of the present inventive concept. Therefore, the present disclosure is not limited only to the drawings and description.

Further, in describing below exemplary embodiments of the present inventive concept, the related well-known functions or constructions will not be described in detail since they may unnecessarily obscure the understanding of the present disclosure. Further, the following terminologies are defined in consideration of the functions in the present disclosure and may be construed in different ways by the intention of users and operators, practice, or the like. Therefore, the definitions thereof should be construed based on the contents throughout the specification.

Further, to effectively describe core technical features of the present disclosure, terms may be appropriately changed, integrated, or separated for those skilled in the art in a technical field to which the present disclosure belongs to explicitly understand the present disclosure, but the present disclosure is not limited thereto.

Hereinafter, one exemplary embodiment of the present inventive concept will be described in detail with reference to the accompanying drawings.

Figure 1:
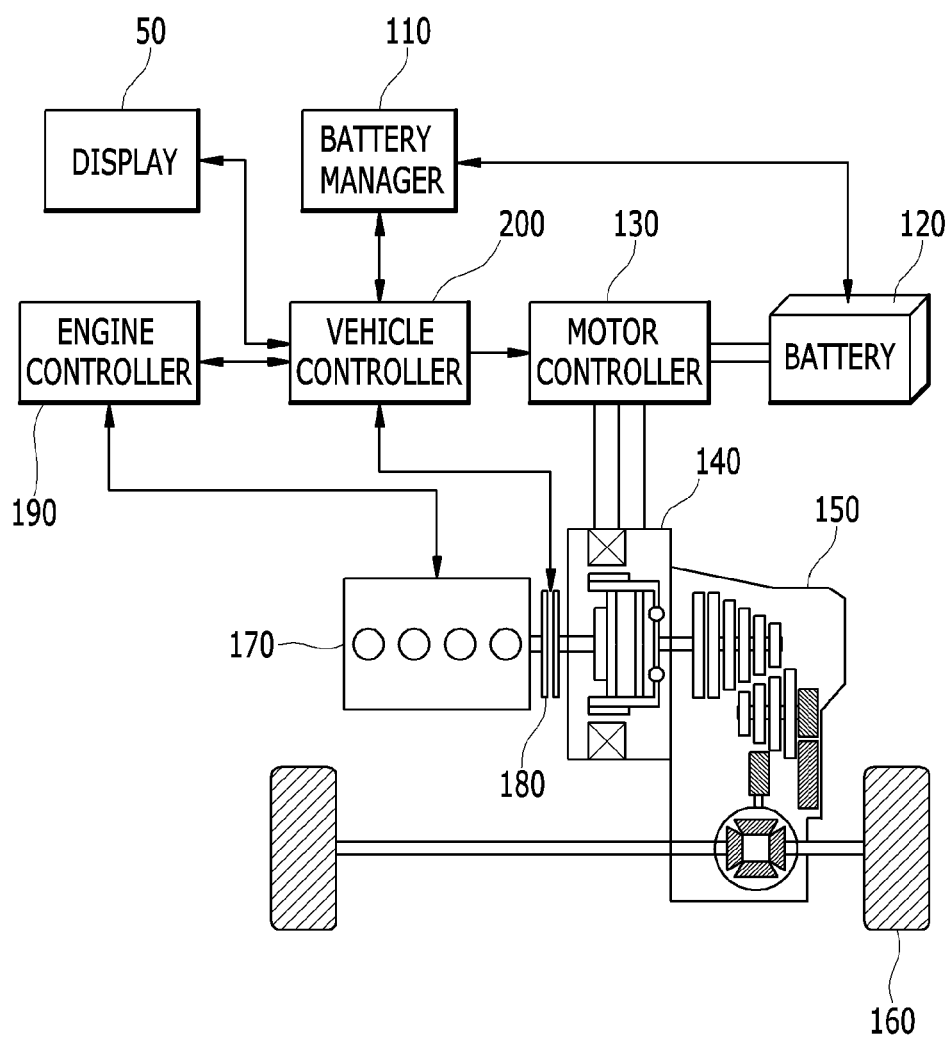
FIG. 1 is a diagram representing an apparatus for providing a distance to empty (DTE) of a green vehicle according to an exemplary embodiment of the present inventive concept.

FIG. 1 is a diagram representing an apparatus for providing a distance to empty (DTE) of a green vehicle according to an exemplary embodiment of the present inventive concept.

Referring to FIG. 1, the apparatus for providing DTE of the green vehicle may be connected to a display 50, and may include a battery manager 110, a battery 120, a motor controller 130, a motor 140, a transmission 150, drive wheels 160, an engine 170, an engine clutch 180, an engine controller 190, and a vehicle controller 200.

The display 50 may display a final distance to empty (DTE) calculated in the vehicle controller 200. The display unit 50 may be installed in at least one of a cluster and a route guidance terminal. Here, the cluster may mean an instrument panel which provides vehicle information such as vehicle speed information, engine speed information, coolant temperature information, etc. to a driver while driving.

The route guidance terminal may receive destination information from the driver of the vehicle, and generate driving information of a designated route based on departure point information and destination information to provide to the vehicle controller 200.

Here, the designated route driving information may include departure point information, destination information, stopover information, travel distance information, road inclination information, or average speed information of the vehicle. The travel distance is a distance from a departure point to a destination. The road inclination information is information corresponding to slopes of a road positioned between the departure point and the destination. The average speed information is a predetermined speed of the vehicle.

The route guidance terminal may provide the designated route information from the departure point to the destination to the driver. The route guidance terminal may be inserted in the vehicle or constructed independently from the vehicle. As long as the route guidance terminal can display the designated driving information and a final DTE, the kind of route guidance terminal is not limited. For example, the route guidance terminal may be any one of a mobile communication terminal, a tablet PC, a mobile computer such as a notebook and a netbook, a navigation device, etc.

The battery manager 110 detects information regarding voltage, current, temperature, etc. of the battery 120 to manage and control a charge state of the battery 120. The battery manager 110 controls a state of charge (SOC) and charge/discharge energy of the battery 120 by control of the vehicle controller 200 to prevent the battery 120 from being over-discharged to below a threshold voltage or being over-charged to above a threshold voltage.

The battery manager 110 provides information regarding the battery 120 to the vehicle controller 200 through a network.

The battery 120 includes a plurality of unit cells, and stores a high voltage to provide a driving voltage to the motor 140. The battery 120 supplies the driving voltage to the motor 140 in a hybrid electric vehicle (HEV) mode or an electric vehicle (EV) mode, and is charged with a voltage generated in the motor 140 during a recovery braking operation.

The battery 120 may also be charged by voltage and current supplied through a charging device when plugged in to a commercial power source.

The motor controller 130 controls driving and torque of motor 140 by control of the vehicle controller 200, and stores electricity generated in the motor 140 in the battery 120 during a recovery braking operation.

A driving torque of the motor 140 is controlled by control of the motor controller 130.

A speed ratio of the transmission 150 is controlled by control of the vehicle controller 200. The transmission 150 distributes and transmits the output torque of the engine 170 and the motor 140, which is combined and applied through the engine clutch 180 according to a driving mode, to the drive wheels 160 at a gear ratio so that the vehicle may be driven.

An automatic transmission or a continuously variable transmission (CVT) may be applied as the transmission 150.

The output of the engine 170 is controlled by control of the engine controller 190, and the engine 170 is controlled by the engine controller 190 to operate in an optimal operating point.

The engine clutch 180 is disposed between the engine 170 and the motor 140 to connect/disconnect power transmission between the engine 170 and the motor 140 according to control of the vehicle controller 200.

The engine controller 190 is connected to the vehicle controller 200 through a network, is interlocked with the vehicle controller 200 to control the entire operation of the engine 170, and provides operational state information regarding the engine 170 to the vehicle controller 200.

The vehicle controller 200 is a superordinate control unit, and integrally controls subordinate control units connected through a network and collects and analyzes information on the respective subordinate control units to control overall driving of the vehicle according to the demand of the driver and a state of the vehicle.

The vehicle controller 200 calculates the final DTE based on fuel efficiency computational amounts of past driving learning and fuel efficiency computational amounts of the designated route.

In another words, the vehicle controller 200 calculates a first DTE by using the past driving fuel efficiency, and calculates a second DTE regarding the designated route information set by the driver or a user. The vehicle controller 200 may calculate the final DTE by using the first DTE and the second DTE. The vehicle controller 200 provides the calculated final DTE to the display unit 50, and controls the display unit 50 to display the final DTE.

A method for calculating the final DTE in the vehicle controller 200 will be described in more detail with reference to FIG. 2 and FIG. 3, and a method of displaying the final DTE will be described in more detail with reference to FIG. 4.

In the vehicle according to the present disclosure including the above-described function, the conventional operation may be executed similarly to conventional vehicles and therefore a detailed description thereof will be omitted.

Figure 2:
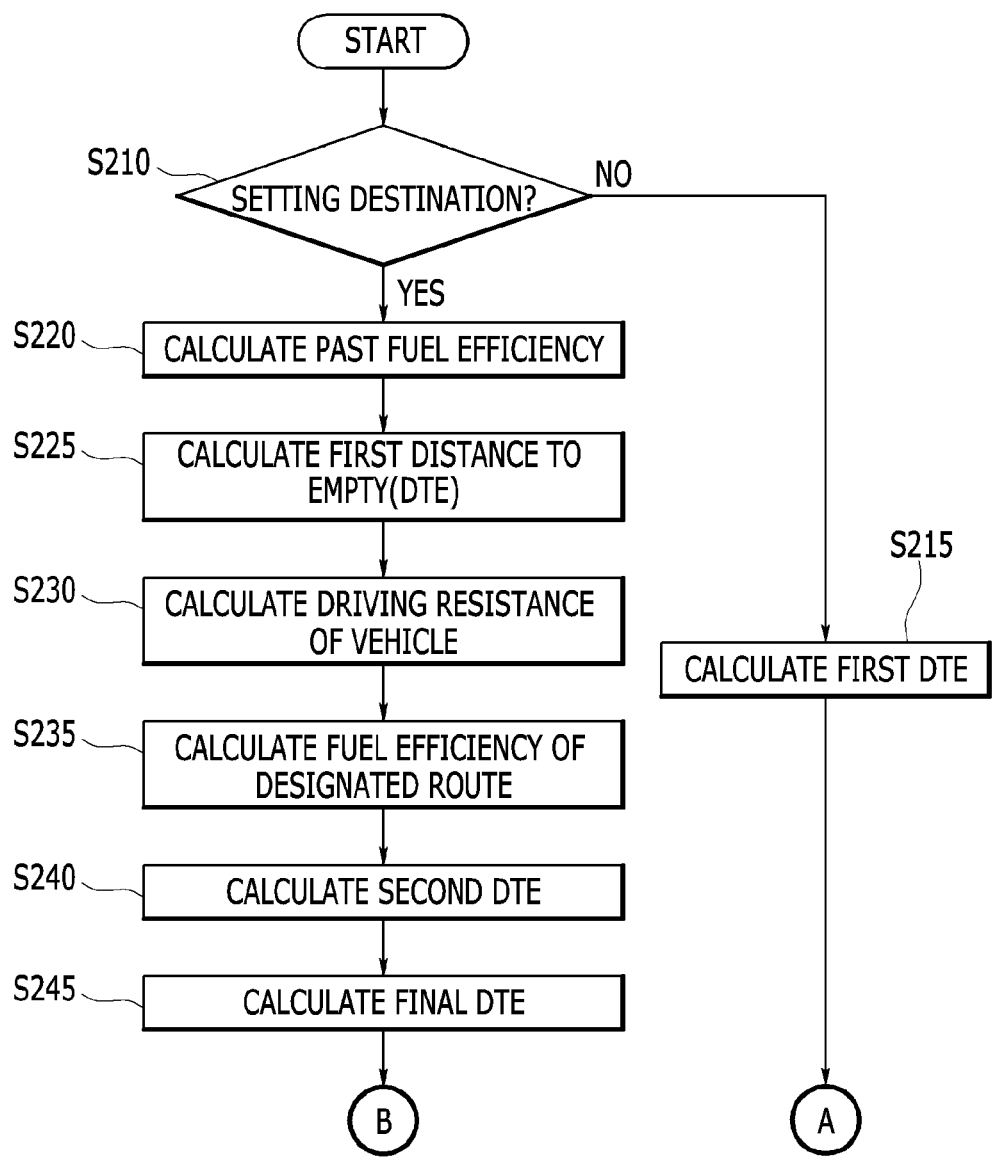
FIG. 2 and FIG. 3 are diagrams representing a method for calculating a final DTE in a green vehicle according to an exemplary embodiment of the present inventive concept.
Figure 3:
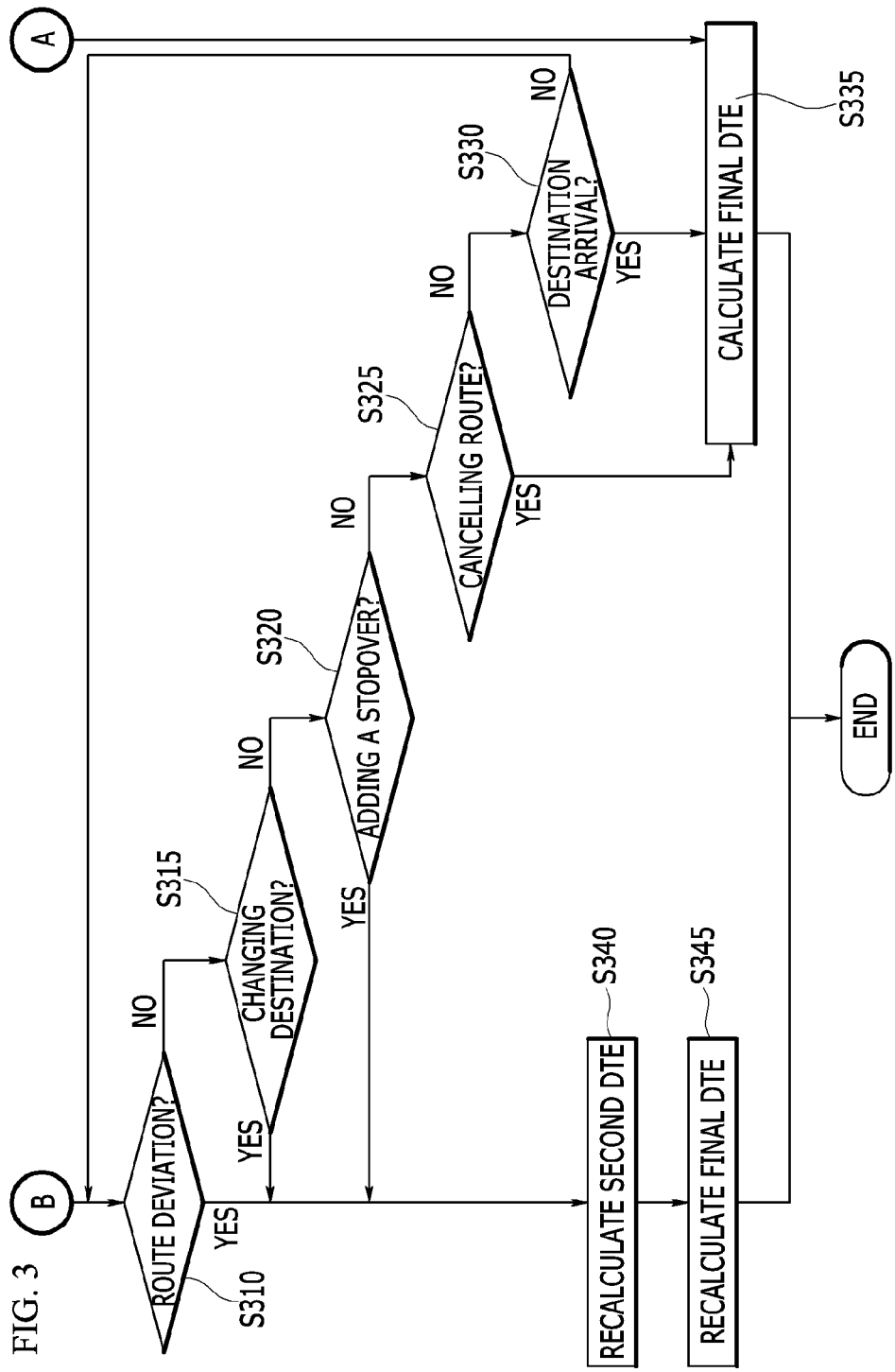

FIG. 2 and FIG. 3 are diagrams representing a method for calculating a final DTE in a green vehicle according to an exemplary embodiment of the present inventive concept.

Referring to FIG. 2 and FIG. 3, the vehicle controller 200 determines whether or not the driver sets a destination in step S210. In other words, the vehicle controller 200 may determine whether the driver inputs the destination through the route guidance terminal.

If the driver does not set the destination, the vehicle controller 200 calculates a first DTE by using a past driving fuel efficiency in step S215. The method of calculating the first DTE will be described in more detail in step S220 and step S225.

If the driver sets the destination, the vehicle controller 200 calculates the past fuel efficiency by using a past battery energy consumption and a past travel distance in step S220. Here, the past travel distance indicates a distance which the vehicle has traveled for a predetermined period of time, which may be set by the driver or set to a default period. The past battery energy consumption represents a battery energy which the vehicle has used while traveling for a predetermined period of time. The vehicle controller 200 may calculate the past fuel efficiency by dividing the past travel distance into the past battery energy consumption. Here, units of the past fuel efficiency may be km/kWh.

The vehicle controller 200 may also calculate the past fuel efficiency by using an SOC of the battery. The vehicle controller 200 may calculate the past fuel efficiency by using a past SOC consumption of the battery and the past travel distance. Here, units of the past fuel efficiency may be km/SOC.

The vehicle controller 200 calculates the first DTE by using the available energy of the battery and the past fuel efficiency in the step S225. In other words, the vehicle controller 200 may calculate the first DTE by dividing the past fuel efficiency into the available energy of the battery. The available energy of the battery represents battery energy which the vehicle can use. In other words, the available energy of the battery may be the same concept as the remaining battery SOC.

The vehicle controller 200 calculates driving resistance of the vehicle by using at least one of travel distance, road inclination information, and an average speed included in the designated route information in step S230. In another words, the vehicle controller 200 may confirm rolling resistance and air resistance based on the average speed, and check tilt resistance based on the road inclination information. The vehicle controller 200 may calculate the driving resistance by using at least one of the rolling resistance, the air resistance, and the tilt resistance. The driving resistance may represent a resistance which is applied to the vehicle while the vehicle is traveling the designated route.

The vehicle controller 200 may calculate the fuel efficiency of the designated route by using at least one of the driving resistance, battery capacity, and average output torque of the motor in step S235. In more detail, the vehicle controller 200 may calculate an expected value of battery energy consumption which is required to move to the destination set by the driver based on at least one of the driving resistance, the battery capacity, and the average output torque of the motor. The vehicle controller 200 calculates the fuel efficiency of the designated route based on the expected value of battery energy consumption and the travel distance. In other words, the vehicle controller 200 may calculate the fuel efficiency of the designated route by dividing the travel distance into the expected value of battery energy consumption. The fuel efficiency of the designated route may represent battery consumption per unit time which is required for the vehicle to move to the designated route, and units of the fuel efficiency may be km/kWh.

The vehicle controller 200 may also calculate the fuel efficiency of the designated route by using the SOC of the battery rather than energy of the battery. That is, the vehicle controller 200 may calculate the fuel efficiency of the designated route by using the expected SOC consumption of the battery and a travel distance of the designated route. Units of the fuel efficiency may be km/SOC.

The vehicle controller 200 calculates a second DTE by using available energy of the battery and the fuel efficiency of the designated route in step S240. In other words, the vehicle controller 200 may calculate the second DTE by executing a division operation on the available energy of the battery and the fuel efficiency of the designated route.

The vehicle controller 200 calculates a final DTE by using the first DTE and the second DTE in step S245. In more detail, the vehicle controller 200 calculates the final DTE by using the first DTE, the second DTE, and a correction coefficient.

In other words, the vehicle controller 200 may calculate the final DTE by using the equation below.

$$DTE=(DTE1*(1-a))+(DTE2*a), \qquad \text{[Equation]}$$

where DTE is the final DTE, DTE1 is the first DTE, DTE2 is the second DTE, and a is a correction coefficient.

Here, the correction coefficient is in a range between 0 and 1, and is determined by a difference between the first DTE and the second DTE and the available energy of the battery. The difference value may be an absolute value of the difference between the first DTE and the second DTE.

In other words, when the difference between the first DTE and the second DTE or the available energy of the battery is large, the vehicle controller 200 sets the correction coefficient to have a value close to 1. As a result, when the available energy of the battery is smaller than a predetermined value, the vehicle controller 200 may calculate the final DTE by placing a weight value to the first DTE. When the difference between the first DTE and the second DTE is larger than a predetermined value, the vehicle controller 200 may calculate the final DTE by placing a weight value to the second DTE.

The vehicle controller 200 determines whether the designated route is deviated from while it guides the designated route information to the driver through the route guidance terminal in step S310.

In step S315, the vehicle controller 200 determines whether the destination is changed if the designated route is not deviated from.

In step S320, the vehicle controller 200 determines whether a stopover is added in the destination route if the destination is not changed.

In step S325, the vehicle controller 200 determines whether the designated route is cancelled if the stopover is not added.

In step S330, the vehicle controller 200 determines whether the vehicle arrives at the destination if the designated route is not cancelled.

The vehicle controller 200 may determine whether the designated route is deviated from by returning to the step S310 if a vehicle does not arrive at the destination.

In step S335, the vehicle controller 200 recalculates a final DTE based on the first DTE if the vehicle arrives at the destination or the designated route has been cancelled. In other words, if the vehicle arrives at the destination or the designated route has been cancelled, the vehicle controller 200 adds battery energy consumption which the vehicle has consumed while traveling, to the past battery energy consumption used in the step S220, and adds a distance which the vehicle has traveled, to the travel distance used in the step S220. The vehicle controller 200 calculates a past driving fuel efficiency based on the added battery energy consumption and the added travel distance, and updates the first DTE calculated in the S225 by using the calculated past driving fuel efficiency.

In step S340, if the event such as the route deviation, the change of destination, and the addition of the stopover occurs, the vehicle controller 200 resets or modifies the designated route driving information based on the changed event, and recalculates a second DTE regarding reset designated route information.

In step S345, the vehicle controller 200 recalculates a final DTE by using the recalculated second DTE and the first DTE calculated in S225.

Figure 4:
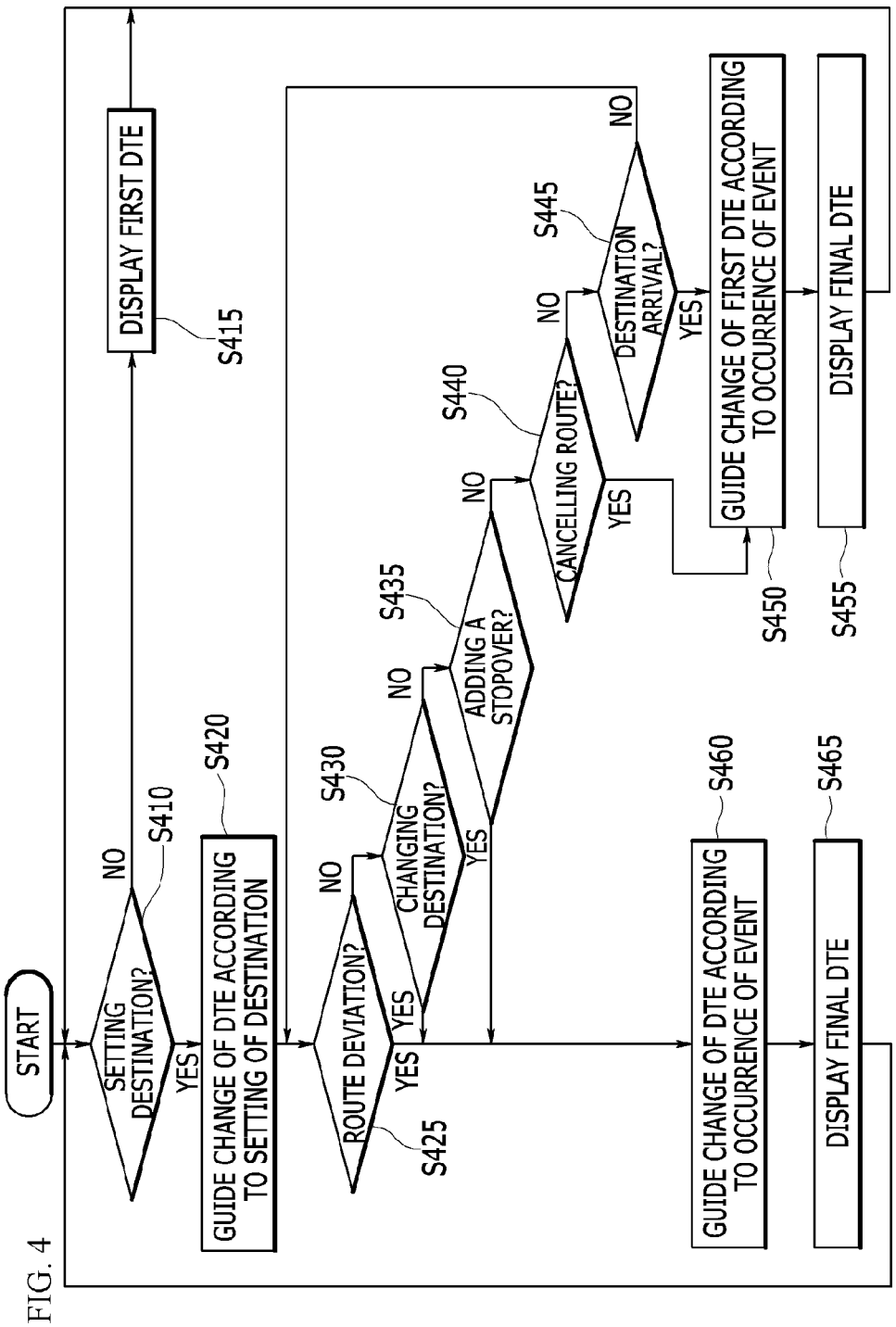
FIG. 4 is a diagram representing a method for providing a final DTE in a green vehicle according to an exemplary embodiment of the present inventive concept.

FIG. 4 is a diagram representing a method for providing a final DTE in a green vehicle according to an exemplary embodiment of the present inventive concept.

Referring to FIG. 4, the vehicle controller 200 determines whether the driver of the vehicle sets a destination in step S410.

In step S415, the vehicle controller 200 controls the display unit 50 to display the first DTE if the driver does not set the destination.

In step S420, the vehicle controller 200 guides change of DTE according to the setting of the destination to the driver if the driver sets the destination. For example, the vehicle controller 200 may inform the driver of the change of DTE according to the setting of the destination through voice guidance. In addition, the vehicle controller 200 controls the display unit 50 to blink the displayed DTE. Accordingly, the driver may perceive the blinking of the DTE.

The vehicle controller 200 determines whether the designated route is deviated from in step S425.

In step S430, the vehicle controller 200 determines whether the destination is changed if the designated route is not deviated from.

In step S435, the vehicle controller 200 determines whether a stopover is added in the destination route if the destination is not changed.

In step S440, the vehicle controller 200 determines whether the designated route is cancelled if the stopover is not added.

In step S445, the vehicle controller 200 determines whether the vehicle arrives at the destination if the designated route is not cancelled.

The vehicle controller 200 may determine whether the designated route is deviated from by returning to the step S425 if the vehicle does not arrive at the destination.

In step S450, the vehicle controller 200 guides change of the first DTE to the driver if the designated route is cancelled or the vehicle arrives at the destination. For example, the vehicle controller 200 may inform the driver of the change of the first DTE according to the cancellation of the designated route or the arrival of the destination through voice guidance. Additionally, the vehicle controller 200 controls the display 50 to blink the displayed DTE. Accordingly, the driver may perceive the blinking of the DTE.

The vehicle controller 200 controls the display 50 to display a final DTE including the changed first DTE in step S455.

In step S460, the vehicle controller 200 may guide change of the DTE according to a route deviation, the change of destination, and the addition of the stopover to the driver. Here, the vehicle controller 200 may control the display 50 to blink the displayed DTE or provide the DTE through voice guidance. Accordingly, the driver may perceive the blinking of the DTE or the voice guidance of the DTE.

Figure 5:
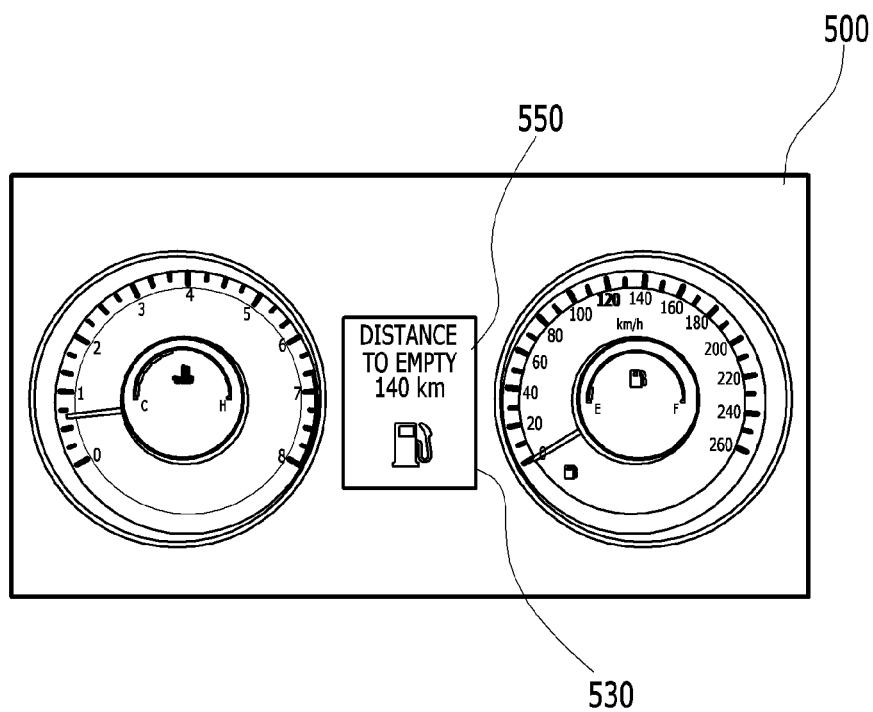
FIG. 5 is a diagram representing a cluster which displays a final DTE in a green vehicle according to an exemplary embodiment of the present inventive concept.

The vehicle controller 200 may control the display 50 to display a final DTE in step S465. For example, as shown in FIG. 5, the final DTE 550 may be displayed in the display (50, 530) formed in a cluster 500.

The vehicle controller 200 determines whether a destination is set by returning to the step S410 after the vehicle controller 200 controls the display 50 to display the final DTE.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. An apparatus for providing a distance to empty of a green vehicle, the apparatus comprising:
    a motor;
    a battery providing a driving voltage to the motor and includes a plurality of cells;
    a motor controller configured to control driving and a torque of the motor;
    a battery manager configured to control charge and discharge of the battery; and
    a vehicle controller configured to integratedly control the motor controller and the battery manager according to a state of the vehicle through a network,
    wherein the vehicle controller calculates a first distance to empty (DTE) by using a past fuel efficiency, calculates a second DTE by using designated route driving information, and calculates a final DTE by using the first DTE and the second DTE, and
    wherein the vehicle controller calculates the final DTE by using the first DTE, the second DTE, and a correction coefficient.

2. The apparatus of claim 1, wherein the vehicle controller calculates the past fuel efficiency by using a past battery energy consumption and a past travel distance, and calculates the first DTE by using the past fuel efficiency and an available energy of the battery.

3. The apparatus of claim 1, wherein the vehicle controller calculates a driving resistance of the vehicle by using at least one of travel distance, road inclination information, and an average speed, calculates a fuel efficiency of a designated route by using at least one of the driving resistance, a battery capacity, and an average torque output of the motor, and calculates the second DTE by using the fuel efficiency of the designated route and an available energy of the battery.

4. A method for providing a distance to empty of a green vehicle, comprising steps of:
    calculating, by a vehicle controller, a first distance to empty (DTE) by using a past fuel efficiency;
    calculating, by the vehicle controller, a second DTE by using designated route driving information according to a departure point and a destination set by a user;
    calculating, by the vehicle controller, a final DTE by using at least one of the first DTE and the second DTE; and
    displaying, by a display which the vehicle controller controls, the final DTE,
    wherein the step of calculating the final DTE comprises a step of calculating, by the vehicle controller, the final DTE by using the first DTE, the second DTE, and a correction coefficient.

5. The apparatus of claim 1, wherein the vehicle controller calculates the final DTE by using Equation 1:

$$DTE=(DTE1*(1-a))+(DTE2*a), \quad \text{[Equation 1]}$$

where DTE is the final DTE, DTE1 is the first DTE, DTE2 is the second DTE, and a is a correction coefficient.

6. The apparatus of claim 1, wherein the vehicle controller calculates a difference between the first DTE and the second DTE, and determines the correction coefficient by using the difference between the first DTE and the second DTE and an available energy of the battery.

7. The apparatus of claim 1, wherein the vehicle controller resets the designated route driving information when at least one event among route deviation, addition of a stopover, and change of a destination occurs in the designated route driving information, and calculates the second DTE by using the reset designated route driving information.

8. The apparatus of claim 1, wherein the vehicle controller updates the first DTE by using a battery energy consumption, and a travel distance which is used when at least one event of route cancellation and destination arrival occurs in the designated route driving information.

9. The apparatus of claim 1, wherein the vehicle controller controls a display to display the final DTE.

10. The apparatus of claim 1, wherein the final DTE is displayed with blinking or outputted as a voice guidance.

11. The method of claim 4, further comprising steps of:
    resetting, by the vehicle controller, the designated route driving information when at least one event of route deviation, addition of a stopover, and change of the destination occurs in the designated route driving information; and
    calculating, by the vehicle controller, the second DTE by using the reset designated route driving information.

12. The method of claim 4, wherein the step of calculating the first DTE comprises steps of:
    calculating, by the vehicle controller, the past fuel efficiency by using a past battery energy consumption and a past travel distance; and
    calculating, by the vehicle controller, the first DTE by using the past fuel efficiency and an available energy of a battery.

13. The method of claim 4, wherein the step of calculating the second DTE comprises steps of:
    calculating, by the vehicle controller, a driving resistance of the vehicle by using at least one of a travel distance, road inclination information, and an average speed;
    calculating, by the vehicle controller, a fuel efficiency of a designated route by using at least one of the driving resistance, a battery capacity, and an average output torque of a motor; and
    calculating, by the vehicle controller, the second DTE by using the fuel efficiency of the designated route and an available energy of a battery.

14. The method of claim 4, further comprising a step of updating, by the vehicle controller, the first DTE by using an energy consumption in a battery and a travel distance which is used when at least one event of route cancellation and destination arrival occurs in the designated route driving information.

15. The method of claim 4, wherein the vehicle controller calculates a difference between the first DTE and the second DTE, and determines the correction coefficient by using the difference between the first DTE and the second DTE and an available energy of the battery.

16. The method of claim 15, wherein the difference is an absolute value of the difference between the first DTE and the second DTE.

17. The method of claim 4, wherein the vehicle controller calculates the final DTE by using Equation 1:

$$DTE=(DTE1*(1-a))+(DTE2*a), \quad \text{[Equation 1]}$$

where DTE is the final DTE, DTE1 is the first DTE, DTE2 is the second DTE, and a is a correction coefficient.

* * * * *